Jan. 30, 1968 R. L. MIDDLETON ET AL 3,365,897
CRYOGENIC THERMAL INSULATION
Filed June 17, 1966

ROBERT L. MIDDLETON
JOHN T. SCHELL
JAMES M. STUCKEY
INVENTORS

BY
Wayland H. Riggins
ATTORNEYS 3,365,897
CRYOGENIC THERMAL INSULATION
Robert L. Middleton and John T. Schell, Huntsville, and James M. Stuckey, Decatur, Ala., assignors to the United States of America as represented by the Administrator of the National Aeronautics and Space Administration
Filed June 17, 1966, Ser. No. 559,350
6 Claims. (Cl. 62—45)

ABSTRACT OF THE DISCLOSURE

A thermal insulation for insulating containers of cryogenic fluids, and particularly for insulating liquid hydrogen fuel tanks of space vehicles. A layer of insulation having a honeycomb core is bonded to the cryogenic fluid container with the cells of the honeycomb core being sealed airtight. When an extremely cold liquid, such as liquid hydrogen, is introduced into the container the air and other gases within the airtight cells are solidified and a cryo-vacuum is produced in each cell so that the honeycomb layer provides the effectiveness of vacuum insulation. A second honeycomb layer may be applied over the first layer with the core of the second layer being filled with pressurized helium gas to purge the second insulation layer of air and prevent the entry of atmospheric air into the insulation through punctures or other openings in the second insulation layer.

---

The invention described herein was made by employees of the United States Government and may be manufactured and used by or for the Government for governmental purposes without the payment of any royalties thereon or therefor.

This invention relates generally to thermal insulation and more particularly to thermal insulation of cryogenic fluid containers.

Current technological pursuits involve an increasing use of cryogenic fluids such as liquid hydrogen, liquid helium and liquid oxygen. Although they are used in a number of scientific and engineering fields, a principal use of cryogenic fluids is found in connection with missile and rocket projects where liquid oxygen and liquid hydrogen, particularly, are used as propellants in the operation of space vehicles.

Cryogenic fluids that are useful as space vehicle propellants have extremely low boiling points and will rapidly boil away in containers lacking special thermal insulation capability. Thus, space vehicle fuel tanks for liquid hydrogen, which at a pressure of 760 millimeters of mercury has a boiling point of −423° F., need to be specially insulated to minimize boil-off during the periods of tank loading, stand-by after fuel loading and awaiting launch, and ascent flight.

A prior insulation for liquid hydrogeen tanks comprises a foam filled layer of cellular material, such as honeycomb core, bonded to the outer surface of the liquid hydrogeen tank, the cellular layer being between 1 and 2 inches thick and having a thin film bonded to the outside thereof to close the honeycomb cells. To assure against the entry of air into the honeycomb cells, gaseous helium is introduced into the cells, passing through holes in the cell walls. This purges the honeycomb insulation of air and prevents entry of air into the insulation due to puncturing of the exterior film or other damage to the insulation or due to defective seals.

The presence of air within the honeycomb core of space vehicle fuel tank insulation cannot be tolerated because it would create a fire or explosion hazard due to oxygen enriched liquid air coming into contact with combustible materials used in the insulation. This hazard can develop if atmospheric air enters the insulation because the air will solidify in the extremely cold temperatures, and subsequently, when the cryogenic fuel is removed from the tank, permitting a rise in the insulation temperature, the nitrogen in the liquified air will boil-off faster than the oxygen to form oxygen enriched liquid air. A shock or impact under these conditions can result in a serious explosion or fire. Also, when the liquified air starts to boil-off under these circumstances a rapid rise in pressure occurs in the honeycomb core which is liable to cause blowouts through the exterior film bonded to the honeycomb core. It is noted that helium, the air purging medium previously mentioned, is inert and liquifies at a point far below the boiling point of liquid hydrogen and thus does not liquify at the surface of a tank containing liquid hydrogen or other cryogenic fluids.

The prior insulation for liquid hydrogen tanks referred to above does not provide the desired degree of insulation effectiveness. This is attributable in part to the presence of helium gas throughout the honeycomb layer which establishes a thermal conductivity through the insulation approximately that of helium gas. Thus, the highly effective vacuum mode of providing thermal insulation is not employed although the cryogenic temperature at the surface of a liquid hydrogen tank constitutes an inherent means of producing a cryo-vacuum in the insulation by the solidification of air and/or certain other gases in the insulation.

Another important aspect of providing a suitable insulation for cryogenic fuel tanks for flight vehicles is that of weight control. The weight of the insulation must be minimized so as not to add unduly to the weight of the flight vehicle. Insulation previously proposed for liquid hydrogen fuel tanks is relatively thick in order to meet insulation requirements and are, therefore, relatively heavy, exceeding 0.8 lb./ft.$^2$.

Accordingly, it is a general object of the present invention to provide an improved means for insulating cryogenic fluid containers.

A more specific object of the invention is to provide a highly effective lightweight thermal insulation for cryogenic fuel tanks of space vehicles.

A further object of the invention is to provide an insulation for cryogenic fluid containers that will localize and minimize the effect of damage to the insulation or of leakage of the insulation.

Another object of the invention is to provide a thermal insulation for cryogenic fluid containers that affords the insulation performance of vacuum insulation while preventing the entry of atmospheric air into the insulation and the attendant hazard and insulation impairment.

These and other objects and advantages of the invention will become more apparent as the description proceeds.

Briefly described, the invention comprises a cellular insulating layer, such as honeycomb core, secured to the surface of a cryogenic fluid container. The cells of the cellular layer are sealed airtight as by a skin sheet or film bonded to the outer side of the cellular layer and an airtight bond of the inner side thereof to the surface of the cryogenic fluid container. When the cryogenic fluid container is filled with an extremely cold fluid, such as liquid hydrogen, a cryo-vacuum is created in the cellular layer by the solidification of air and/or other gases in the cells at cryogenic temperatures. The cellular layer, thus cryovoided, provides the thermal insulation performance of vacuum insulation.

According to one aspect of the invention, a second sealed celular layer is applied over the layer designed to be cryovoided. This second cellular layer is filled with helium gas which purges the second layer of air and prevents atmospheric air from entering either of the cellular layers in case of damage to the insulation, such as puncturing, or in the case of leaks in the insulation.

In describing the invention in detail, reference will be made to the accompanying drawing in which.

Figure 1:
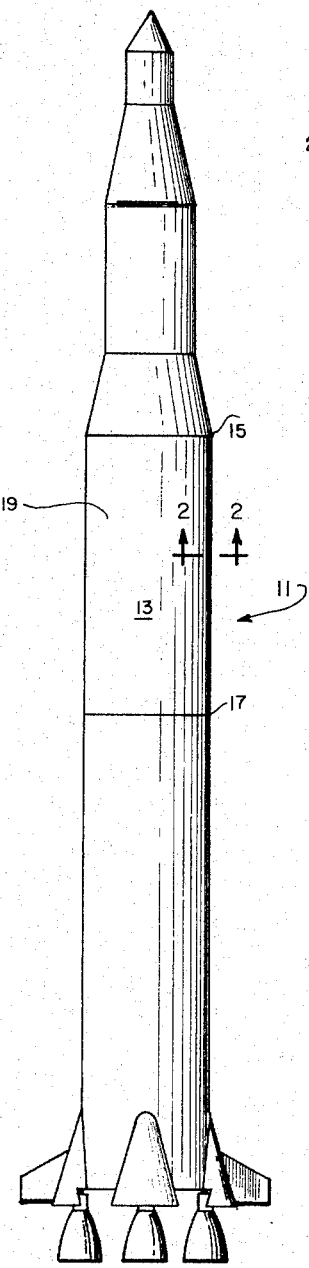
FIGURE 1 is a view in elevation of a space vehicle with one stage thereof comprising a fuel tank for containing liquid hydrogen and with the insulation embodying the present invention disposed externally around the fuel tank.

Referring now to FIGURE 1, a space vehicle 11 is shown having a second stage 13 defined by an upper end 15 and a lower end 17. The portion of the second stage 13 extending from the upper end 15 thereof most of the distance to the lower end 17 constitutes essentially a fuel tank 19 for containing liquid hydrogen.

As indicated above, the characteristics of liquid hydrogen are such that when a fuel tank of a space vehicle is filled with this propellant it is necessary to insulate the tank against heat transfer in order to minimize hydrogen loss due to boil-off. This insulation is accomplished, according to the invention, by covering the skin or exterior wall of the fuel tank 19 with an insulation assembly 21 (FIGURE 2).

Figure 2:
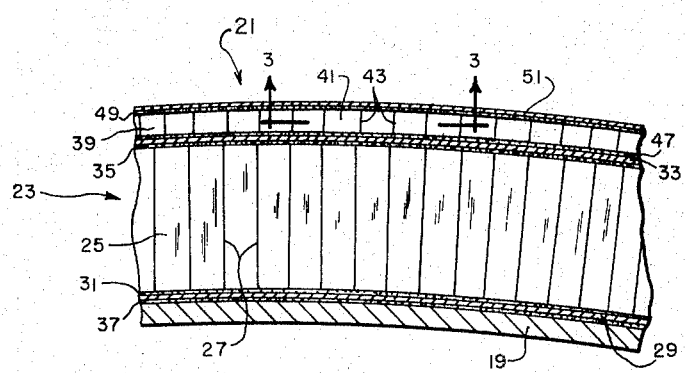
FIGURE 2 is a cross-sectional view, enlarged for clarity, of the outer wall of a liquid hydrogen fuel tank taken along line 2—2 of FIGURE 1.
Figure 3:
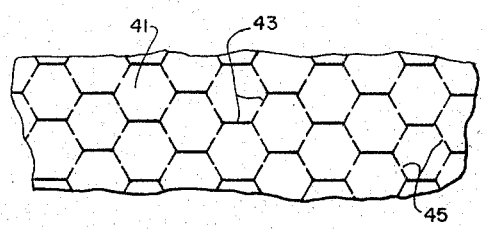
FIGURE 3 is a cross-sectional view, taken along line 3—3 of FIGURE 2.

In FIGURE 2 the insulation assembly 21 includes a cellular insulating layer 23, such as a honeycomb core, having open cells 25 defined by cell walls 27. An airtight film 29 is bonded by adhesive 31 to the inner side of the cellular insulating layer 23 and an airtight film 33 is bonded by adhesive 35 to the outer side thereof thus sealing the cells 25. The layer 23 is secured to the fuel tank 19 by adhesive 37 disposed between the film 29 and the exterior surface of the tank 19. Although the film 29 is preferred in some applications of the invention as contributing to the rigidity and reliability of the insulation, it has been found that this film may be omitted by bonding the layer 23 directly to the fuel tank 19.

Overlying the sealed cellular insulating layer 23 is a relatively thin second cellular layer 39 having open cells 41 by cell walls 43. In the center of each of the diagonal cell walls 43 is a small diameter hole 45, the purpose of which will be explained hereinafter.

The second cellular layer 39 is joined to the layer 23 by an adhesive 47 between the inner side of the layer 39 and the film 33. Bonded to the outer side of the layer 39 by adhesive 49 is a skin 51 that comprises the exterior surface of the insulation assembly.

One example of an insulation assembly 21 that has been found to provide superior thermal insulation for cryogenic containers, plus the strength and lightweight characteristics so vital in flight hardware, incorporated materials and dimensions as set forth in Table 1.

TABLE 1

| Element | Material | Dimensions |
| --- | --- | --- |
| Skin 51 | Aluminum foil | 0.003″ thick. |
| Adhesive 49 | Epoxy phenolic adhesive. | 0.09 lb./ft.$^2$ |
| Cellular Layer 39 | Fiberglass cloth reinforced phenolic plastic honeycomb core. | Honeycomb core, 0.2″ thick; cell width, 3/8″; cell walls, 0.003″ thick; holes in cell walls 0.060″ dia. |
| Adhesive 47 | Epoxy phenolic adhesive. | 0.09 lb./ft.$^2$ |
| Film 33 | Aluminum foil | 0.0015″ thick. |
| Adhesive 35 | Modified epoxy adhesive. | 0.05 lb./ft.$^2$ |
| Cellular Layer 23 | Polyester honeycomb core. | Honeycomb core, 0.45″ to 0.6″ thick; cell width 3/8″; cell walls, 0.003″ thick. |
| Adhesive 31 | Polyurethane adhesive. | 0.04–0.05 lb./ft.$^2$ |
| Film 29 | Polyester | 0.0002″ thick. |
| Adhesive 37 | Polyurethane | 0.04–0.06 lb./ft.$^2$ |

While the inventive concept is obviously not limited to the materials or dimensions indicated in Table 1, these materials do have certain attributes which are desirable for some applications of the invention, and particularly as the invention is applied as an insulation for a fuel tank of a space vehicle. During flight of a space vehicle the insulation is exposed to aerodynamic forces as well as ascent heating which may raise the temperature of the insulation skin from a very low temperature to approximately 350° to 400° F. for a brief period. It is important that the insulation be made of lightweight materials that possess the required characteristics of strength, low permeability to air and other gases, and tolerance of a wide range of temperatures.

Thus aluminum foil is a good material for skin 51 and the film 33 because of its lightweight and strength characteristics, low permeability and low porosity and ability to withstand a wide range of temperatures. The cellular layer 39 may be exposed to severe aerodynamic forces and very high temperatures; therefore, a strong heat resistant material such as phenolic plastic is appropriate. The qualities of strength, flexibility and lightweightness as well as an adequate tolerance of temperature variations recommend polyester as a suitable material for the cellular layer 23 and the film 29. Adhesives were selected for ability to form effective and flexible bonds between the respective materials with the bonds being reliable over a wide range of temperatures.

The weight of the inventive insulation incorporating the materials and dimensions indicated in Table 1 and using the 0.6 inch thick cellular layer 23 is approximately 0.5 lb./ft.$^2$. This constitutes a major reduction in weight over the relatively thick, helium purged insulation previously proposed for liquid hydrogen fuel tanks and which weighs over 0.8 lb./ft.$^2$.

When the insulation 21 has been applied to the fuel tank 19 and before the tank is filled with liquid hydrogen, the interior of the cellular layer 39 is purged by the introduction of helium gas through suitably located connections (not shown). The holes 45 in the diagonal cell walls 43 of the cellular layer permit the helium to flow throughout the entire layer. The helium gas is maintained in the layer 39 under a pressure of from 2 to 6 p.s.i.

As the fuel tank 19 is filled with liquid hydrogen the sealed cells 25 of the cellular layer 23 are subjected to cryogenic temperatures and are cryo-voided by the solidification of air and/or other gases at cryogenic temperatures. These cells, thus cryo-voided, provide the high thermal insulation effectiveness approaching that of vacuum insulation.

With the inner cellular layer 23 providing the thermal performance of a vacuum insulation and the outer layer 39 constituting a helium purge channel, any damage to the insulation assembly, such as puncturing, will cause a minimum impairment of the insulation effectiveness of the assembly. Thus, in the event the assembly is punctured, helium under pressure will flow through the hole in the outer skin 51 preventing air from entering the insulation. The helium gas will also enter the punctured cell in the layer 23 but will be confined to the punctured cell due to the sealed cell structure of the layer 23, and the vacuum insulation qualities of the layer 23 will be virtually unaffected.

Figure 4:
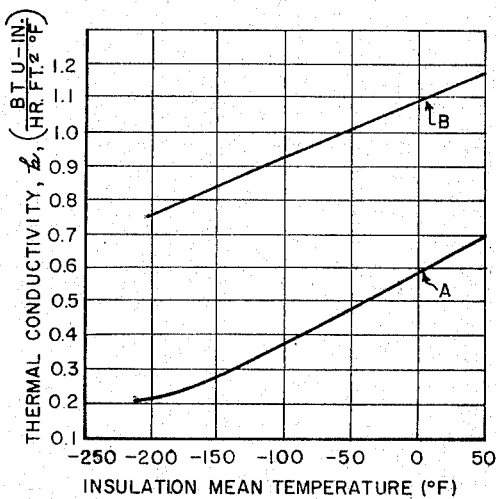
FIGURE 4 is a graph comparing the thermal performance of the present invention with the prior art foam-filled helium purged, honeycomb insulation.

The graph of FIGURE 4 indicates the thermal performance of the described specific embodiment of the invention (Curve A) compared with the thermal performance of the prior art foam-filled, helium purged, honeycomb insulation (Curve B) discussed herein preferatorily. It is noted that over an insulation mean temperature range of from approximately −200° F. to 50° F., which range includes the mean temperatures most likely to be experienced by cryogenic insulation, the thermal conductivity of the insulation of the present invention is well below that of the prior art insulation.

It is seen from the foregoing that the invention assembly embodied in FIGURE 2 retains the reliability and non-hazard features of the previously proposed helium purged insulation while providing the superior insulation performance characteristics of vacuum insulation.

While in the specific embodiment described above the invention is employed as an insulation for a liquid hydrogen fuel tank, it is understood that the cryo-voided sealed cell concept is applicable generally as insulation for cryogenic containers. Moreover, the sealed cellular layer 23 (FIGURE 2) having the cells 25 sealed as by airtight film 29 and 33 provide a highly effective cryogenic insulation without the overlying helium purged layer 39, although, as explained previously, the layer 39 is very useful as a means of keeping atmospheric air out of the insulation. Therefore, when using a single layer embodiment of the invention, such as layer 23 (FIGURE 2), it may be desirable under some circumstances to seal the cells with a very nonporous film such as laminates of aluminum or lead with polyester film to prevent the entry of air into the cells and thus avoid the possible hazards discussed hereinabove connected with entry of atmospheric air into the insulation. All of the insulation materials should be adapted to the conditions, such as temperature and stress, under which the insulation is to be used.

In using the invention for insulating containers of cryogenic fluids that liquify at higher temperatures relative to liquid hydrogen, for example, liquid nitrogen or liquid oxygen, the sealed cells of the cellular layer, such as 23 (FIGURE 2), may be filled with a gas having a relatively high freezing point. This can be done by sealing the cellular layer in an atmosphere of the particular gas, for example, Freon or carbon dioxide, desired for occupying the cells. Gases having freezing points above −297° F. will solidify and "freeze out" at a higher temperature than air, and gases of this type may be selected to create the cryo-vacuum state within the sealed cells at temperatures induced by the particular cryogenic fluid being insulated.

Obviously, many modifications and variations of the present invention are possible in light of the above teachings. It is, therefore, to be understood that within the scope of the appended claims the invention may be practiced other than as specifically described.

What is claimed is:
1. A thermally insulated cryogenic fluid container comprising:
   (a) a container wall;
   (b) an insulating layer covering and being contiguous with an outer surface of said container wall;
   (c) said insulating layer comprising a plurality of airtight cells formed in part by a cellular core having an air-impervious film bonded thereto;
   (d) a cryogenic fluid within said container being in contact with said container wall;
   (e) each of said airtight cells constituting a cryo-voided space due to cryogenic temperatures effected within said cells by said cryogenic fluid whereby a cryo-vacuum is produced within each of said cells;
   (f) a second layer superposed on said insulating layer;
   (g) said second layer comprising a cellular core;
   (h) said second layer cellular core being bonded on one side thereof to said air-impervious film;
   (i) aluminum foil bonded to said second layer cellular core on the surface thereof opposite said air-impervious film.

2. The invention as defined in claim 1 wherein the cells of said second layer are filled with an air purging gas.

3. The invention as defined in claim 2 wherein said air purging gas is helium maintained under a pressure of from 2 to 6 p.s.i.

4. The invention as defined in claim 1 wherein said cellular core of said insulating layer is composed of polyester and said cellular core of said second layer is composed of reinforced phenolic plastic, the combined thickness of both of said cellular cores not exceeding 0.8 inch.

5. The invention as defined in claim 1 wherein said cryogenic container comprises a fuel tank, a space vehicle incorporating said fuel tank, said cryogenic liquid being liquid hydrogen.

6. The invention as defined in claim 1 wherein said cryogenic fluid is liquid hydrogen.

References Cited

UNITED STATES PATENTS

| | | | |
|---|---|---|---|
| 2,941,759 | 6/1960 | Rice et al. | 62—239 |
| 3,007,596 | 11/1961 | Matsch | 62—45 |
| 3,069,042 | 12/1962 | Johnston | 62—45 |
| 3,089,318 | 5/1963 | Hebeler | 62—239 |
| 3,110,156 | 11/1963 | Niemann | 62—45 |
| 3,139,206 | 6/1964 | Matsch | 62—45 |
| 3,159,005 | 12/1964 | Reed et al. | 62—45 |
| 3,210,933 | 10/1965 | Crews et al. | 62—467 |
| 3,306,059 | 2/1967 | Stelts et al. | 62—45 |

FOREIGN PATENTS 1,162,473  4/1958  France.

LLOYD L. KING, *Primary Examiner.*